(12) United States Patent
Cheshmehdoost et al.

(10) Patent No.: US 6,912,922 B2
(45) Date of Patent: Jul. 5, 2005

(54) TORQUE SENSING APPARATUS AND METHOD (75) Inventors: Abdolreza Cheshmehdoost, Ruislip (GB); Brian Johnson, Saltash (GB)

(73) Assignee: First Inertia Switch Limited, Hampshire (GB)

( * ) Notice: Subject to any disclaimer, the term of this patent is extended or adjusted under 35 U.S.C. 154(b) by 242 days.

(21) Appl. No.: 10/003,177

(22) Filed: Nov. 2, 2001

(65) Prior Publication Data
US 2002/0112549 A1 Aug. 22, 2002

Related U.S. Application Data (63) Continuation-in-part of application No. 09/727,101, filed on Nov. 30, 2000.

(30) Foreign Application Priority Data

Nov. 21, 2000 (GB) .............................................. 0028385

(51) Int. Cl.$^7$ ................................................. G01L 3/02
(52) U.S. Cl. .................................................. 73/862.333
(58) Field of Search ............................ 73/862, 331–336

(56) References Cited

U.S. PATENT DOCUMENTS

| 4,135,391 A | 1/1979 | Dahle |
| 4,364,278 A | 12/1982 | Horter et al. |
| 4,523,482 A | 6/1985 | Barkhoudarian |
| 4,572,005 A | 2/1986 | Kita |
| 4,596,150 A | 6/1986 | Kuhr |
| 4,803,885 A | 2/1989 | Nonomura et al. |
| 5,351,555 A | 10/1994 | Garshelis |
| 6,020,737 A | * | 2/2000 | Wyss ..................... 324/207.25 |

FOREIGN PATENT DOCUMENTS

| DE | 3437379 A1 | 4/1984 |
| EP | 0 103 354 A2 | 3/1984 |
| EP | 0 352 187 A1 | 1/1990 |
| GB | 829399 | 3/1960 |
| GB | 2 196 432 A | 4/1988 |
| WO | 91/19175 | 12/1991 |
| WO | 99/21150 | 4/1999 |
| WO | 99/21151 | 4/1999 |
| WO | 99/56099 | 11/1999 |

* cited by examiner

Primary Examiner—Max Noori
(74) Attorney, Agent, or Firm—Renner, Otto, Boisselle & Sklar, LLP (57) ABSTRACT A torque sensor comprising a shaft of magnetostrictive material; a pair of magnets having oppositely sensed poles positioned circumferentially around the shaft so as to induce a localized magnetic field in the shaft between the poles. A torque applied to the shaft is sensed by a flux detector positioned circumferentially between the magnet poles so as to detect a component of the localized magnetic field which escapes from the shaft as a result of the torque. With this design, there is no need to permanently magnetize the shaft or a collar attached to the shaft, as in the prior art. The prior art manufacturing step of permanently magnetizing the collar or its shaft is also thus eliminated, greatly simplifying the manufacturing.

16 Claims, 9 Drawing Sheets

PRIOR ART

Fig. 17

PRIOR ART

TORQUE SENSING APPARATUS AND METHOD

This application is a continuation-in-part of application Ser. No. 09/727,101 filed Nov. 30, 2000, which is hereby incorporated herein by reference in its entirety.

BACKGROUND ART

This invention relates to torque sensors, more specifically to magnetostrictive torque sensors.

The magnetostrictive effect may be termed as the change of dimensions of a material when exposed to a magnetic field or its inverse effect, i.e. the change in magnetization of a material as a result of external stress. This inverse magnetostrictive effect is sometimes referred to as the magnetoelastic effect, but the term magnetostrictive is used exclusively in the present document. Generally, the magnetostrictive effect is associated with ferromagnetic materials.

Figure 16:
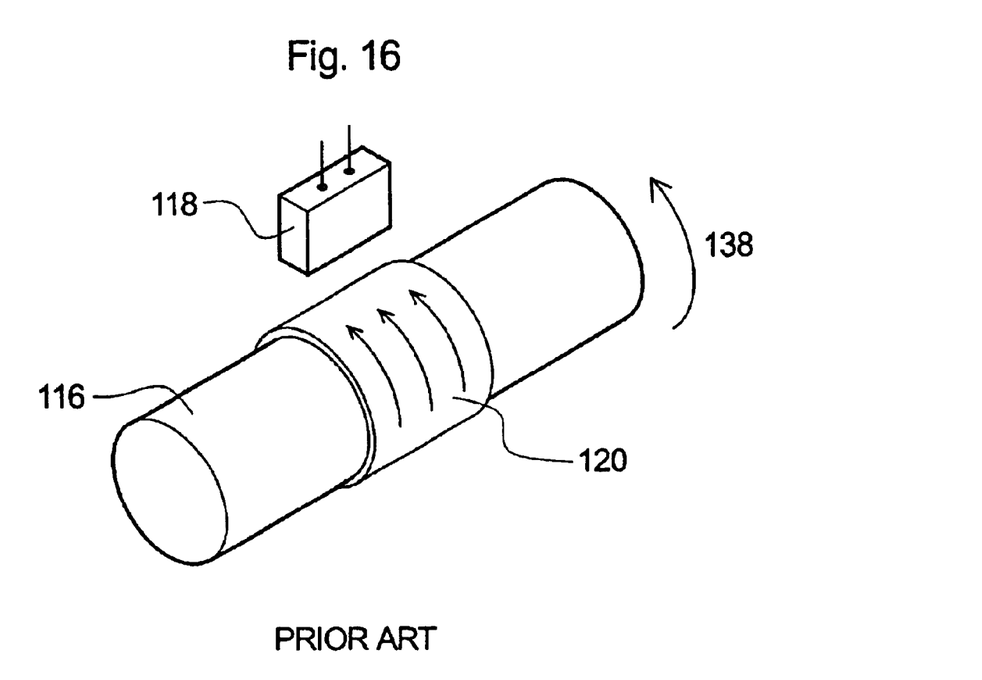
FIG. 16 is a schematic view of a prior art magnetostrictive torque sensor according to U.S. Pat. No. 5,351,555.

U.S. Pat. No. 5,351,555 discloses a non-contact torque sensor of the magnetostrictive type which can be used with rotating shafts. As illustrated in FIG. 16 of the accompanying drawings, the torque sensor comprises a collar 120 fitted tightly onto a shaft 116. The collar 120 is magnetized circumferentially around the shaft as indicated by arrows in the figure. When the shaft 116 is torqued, the torque is transmitted to the collar 120 and induces a helical magnetic field therein. A component of the helical field is sensed by an externally positioned magnetic flux detector 118 from which the magnitude of the torque can be inferred.

Although these designs work well, they have been criticized for several reasons. One problem is that under high torque conditions it is possible that slippage of the collar on the shaft may occur. Another issue is the manufacturing costs associated with making and fitting the collar to the shaft, which have been said to be too high.

Figure 17:
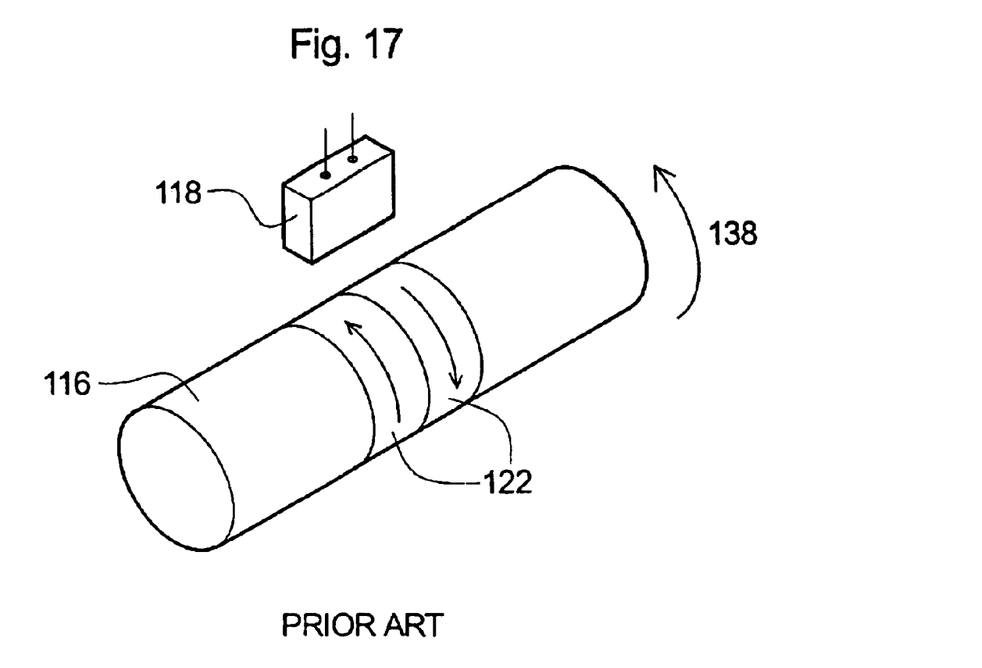
FIG. 17 is a schematic view of a prior art magnetostrictive torque sensor according to WO 99/21150.

WO 99/21150, WO 99/21151 and WO 99/56099 disclose various designs of torque sensor which address the shortcomings of the collar-based designs. In these more recent designs, a portion of the shaft itself is magnetized, thereby allowing a separate magnetized collar to be dispensed with. FIG. 17 of the accompanying drawings illustrates an example of these collarless designs. A shaft 116 has integral portions thereof 122 magnetically polarized in the circumferential direction, i.e. around the shaft, as in the collar-based designs. Multiple polarized regions are preferred, with adjacent domains being oppositely magnetically polarized, as illustrated in the figure in which two such domains are shown. Torquing of the shaft causes a change in the magnetic field external to the shaft, which is measured by a suitable magnetic flux detector 118, similar to the collar-based designs.

One problem common to all these designs is their dependence on the permanent polarization of the collar or shaft. The magnetic polarization is induced during manufacturing, but manufacturing variations cause variations in the polarization strength, which in turn cause variations in sensitivity between different sensors. Although measures are proposed in WO 99/56099 to control this variation, the measures are quite complex. More seriously, all of the above-mentioned designs depend on, and assume, long-term stability of the magnetically polarized part of the sensor. If the magnetic polarization decays, then a given external torque applied to the shaft will result in a lower output from the magnetic flux detector. Periodic recalibration of the sensor will therefore be required if absolute sensitivity is needed. If the decay is more serious, then remagnetisation of the magnetized part of the torque sensor or more likely replacement of the whole sensor will be necessary.

It is therefore an aim of the invention to provide a torque sensor that reduces the prior art dependence on magnetic polarization strength.

SUMMARY OF THE INVENTION

According to a first aspect of the present invention there is provided a torque sensor comprising: a shaft comprising magnetostrictive material; a pair of opposite magnet poles positioned circumferentially around the shaft so as to induce a localized magnetic field in the magnetostrictive material between the opposite magnet poles; and a torque-sensing flux detector positioned to detect a component of the localized magnetic field which escapes from the magnetostrictive material when the shaft is torqued.

In this way, there is no need for a permanently magnetically polarized part of the torqued component, i.e. the shaft or its collar, which is essential to all the above-reference prior art designs. The magnetic field in the torqued component is instead induced with an external magnetic field. As a result, the magnetic field strength is easily quantified, for example by additional flux detectors arranged close to the external magnet poles. Another consequence of the proposed design is that the prior art manufacturing step of permanently magnetizing the collar or shaft is completely eliminated, thus greatly simplifying the manufacture of the torque sensor.

The magnetostrictive shaft may be made from a wide range of ferromagnetic materials including many types of stainless steel, tool steel and Ni—Fe alloys. This gives the advantage that the magnetostrictive torque sensor can be retrofitted to a component including a shaft that is torqued, since the shaft does not need to be magnetized or have extra coatings or collars attached to it.

In one embodiment, the magnetostrictive torque sensor comprises a magnetostrictive shaft that has a main body of non-ferromagnetic material surrounded by a layer of magnetostrictive material. A sensor of this kind is especially advantageous, since it allows design freedom in the choice of the shaft. For example, the shaft can be made of a non-ferromagnetic metal or composites.

The magnets may be permanent magnets or electromagnets.

Further flux detectors positioned adjacent to the magnets can be provided to give an independent measurement of the strength of the magnets. The output of the further flux detectors can be combined with the output from the flux detectors positioned to measure torque so that variations in the strength of the magnets can be compensated for. This arrangement has the advantage over the prior art where the permanent circumferential magnetic field in either the shaft or its collar cannot be quantified during measurement. The prior art sensors require a known torque to be applied to them in order to check the calibration, which is impractical or difficult to achieve in some situations, e.g. for a steering column in an automobile.

The invention may find a wide range of applications. For example, a torque sensor embodying the invention may be incorporated in an automobile steering column or an automotive gearbox. In the case of a gearbox, the torque sensor may be arranged to measure torquing of the gearbox main shaft and arranged inside the main gearbox casing, for example.

According to a second aspect of the invention there is provided a method of sensing torque comprising:

(a) providing a shaft comprising magnetostrictive material;

(b) applying an external magnetic field to the shaft using a pair of opposite magnet poles positioned circumferentially around the shaft so as to induce a localized magnetic field in the magnetostrictive material between the opposite magnet poles;

(c) torquing the shaft so that a component of the internal magnetic field escapes from the magnetostrictive material; and (d) detecting the escaped component of the internal magnetic field and providing a torque signal responsive thereto.

In one embodiment, the torque sensor comprises: a shaft comprising magnetostrictive material; a pair of opposite magnet poles defining an axis that is aligned tangentially to a circumferential surface of the shaft so as to induce a localized magnetic field in the magnetostrictive material between the opposite magnet poles; and at least one torque-sensing flux detector positioned to detect a component of the localized magnetic field which escapes from the magnetostrictive material when the shaft is torqued. In this embodiment, the at least one torque-sensing flux detector preferably comprises a pair of torque-sensing flux detectors positioned on opposite sides of the shaft circumferentially displaced from the pair of opposite magnet poles.

In a further embodiment, the torque sensor comprises: a shaft comprising magnetostrictive material; a first pair of opposite magnet poles defining a first axis that is aligned tangentially to a circumferential surface of the shaft so as to induce a first localized magnetic field in the magnetostrictive material in a first circumferential direction; a second pair of opposite magnet poles arranged axially displaced along the shaft from the first pair of opposite magnet poles and defining a second axis that is aligned tangentially to the circumferential surface of the shaft so as to induce a second localized magnetic field in the magnetostrictive material in a second circumferential direction opposed to the first circumferential direction; and first and second torque-sensing flux detectors positioned to detect first and second components of the first and second localized magnetic fields which escape from the magnetostrictive material when the shaft is torqued.

In another embodiment, the torque sensor comprises: a shaft comprising magnetostrictive material; a pair of opposite magnet poles defining an axis that extends through the shaft; and at least one torque-sensing flux detector positioned to detect a component of the localized magnetic field which escapes from the magnetostrictive material when the shaft is torqued.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
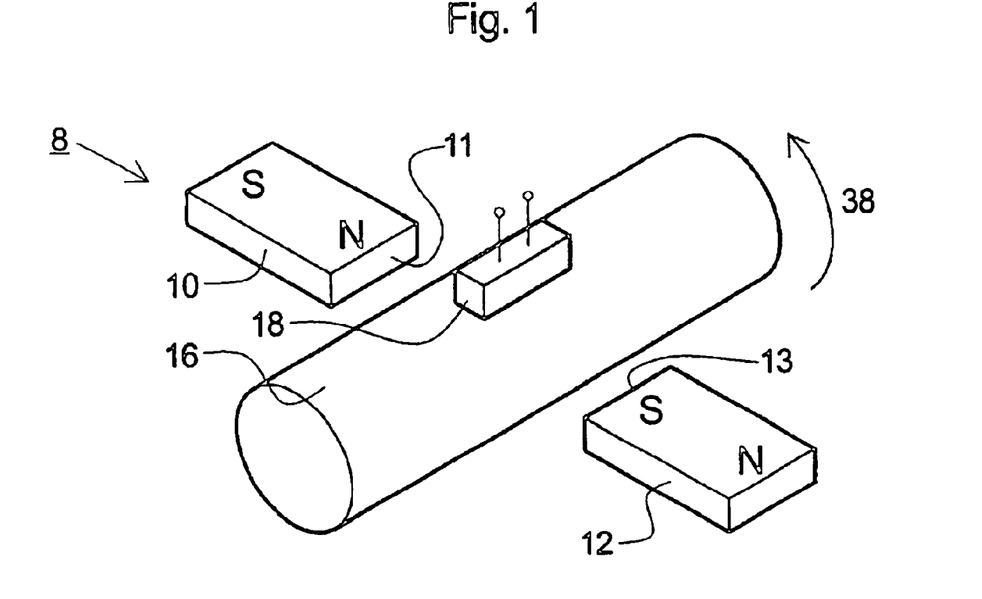
FIG. 1 is a schematic view of a magnetostrictive torque sensor according to a first embodiment of the invention.

FIG. 1 is a schematic diagram of a magnetostrictive sensor 8 according to a first embodiment of the invention. The magnetostrictive sensor 8 comprises a shaft 16 that can be subjected to a torque 38 to be sensed, as illustrated by an arrow in the figure. The shaft 16 is made of a magnetostrictive material, but is not itself permanently magnetized (in contrast to the prior art designs referred to in the introduction). Instead of permanently magnetizing the shaft, the shaft 16 is magnetized in situ by an external magnetic field generated by a pair of permanent magnets 10 and 12.

The shaft 16 is made of the magnetostrictive material "Terfenol-D" which has a very high magnetostrictive coefficient $\lambda=\Delta L/L$ of the order of $2000\times10^{-6}$. Generally, materials with magnetostrictive coefficients of at least $20\times10^{-6}$ are preferred for the shaft, although a shaft made of material with a lower magnetostrictive coefficient will still function.

Some examples of other suitable materials for the shaft are:

1. maraging Ni—Fe alloys;
2. 17-4 PH, 17-7 PH and 15-5 PH Stainless steels;
3. tool steel;
4. Ni—Fe with a Ni content between 14–28%;
5. Ni—Fe with a Ni content between 42–65%;
6. Ni—Fe Alloy 718 (AMS 5663E);
7. Alloy Supermet 625;
8. Permenorm 5000 H2;
9. Dimag 1, 2 and Dimag X;
10. Fe/B/Si alloys.

The permanent magnets 10 and 12 are arranged so that a pair of opposite magnet poles 11 and 13 (i.e. North and South) are positioned circumferentially around the shaft and facing the shaft so that a localized magnetic field is induced in the magnetostrictive material of the shaft between the opposite magnet poles 11 and 13. In the figure, the permanent magnets 10 and 12 are arranged diametrically opposite to each other about the magnetostrictive shaft 16 with one of their end faces 11 and 13 lying tangential to the surface of the magnetostrictive shaft 16.

In an alternative construction (not shown), a single permanent magnet could be used in place of a pair of magnets with the individual poles of the single permanent magnet being arranged in the same positions as the poles 11 and 13 of the two magnets of the first embodiment. For example, a horseshoe-like shape of the magnet would allow for such a construction.

A magnetic flux detector 18 is positioned circumferentially between the permanent magnets 10 and 12 so as to detect a component of the localized magnetic field which escapes from the magnetostrictive material when the shaft is subjected to the torque 38. The preferred flux detector 18 is a saturated coil detector. However, a variety of other flux detectors could be used, e.g. Hall detector, magnetoresistance, magnetotransistor or MAGFET (Magnetic Field Effect Transistor) sensors.

Figure 2:
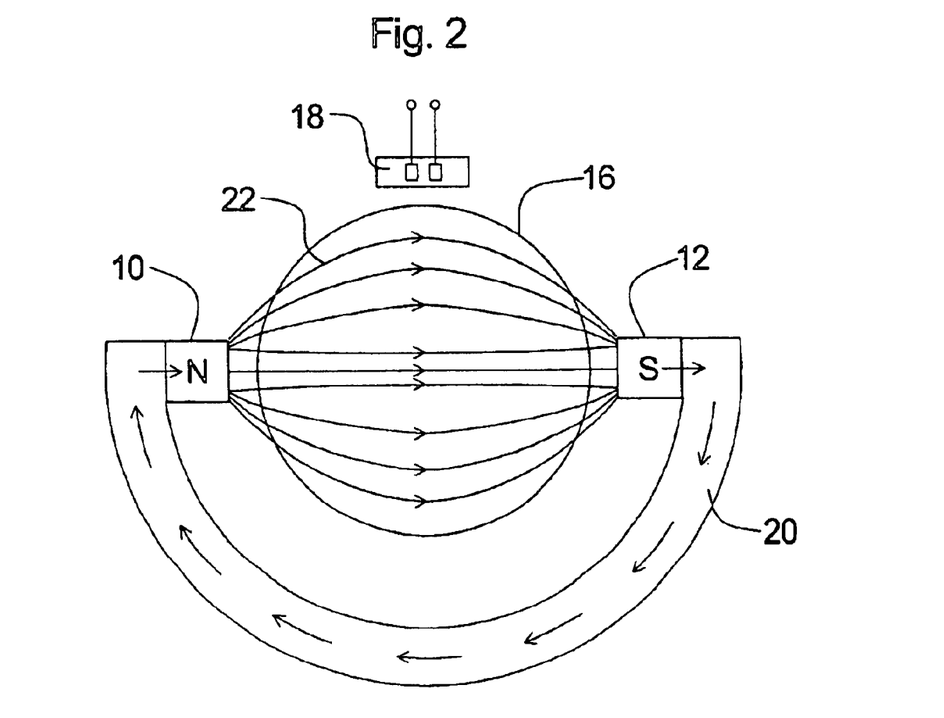
FIG. 2 is a cross-sectional view showing the magnetostrictive torque sensor of the first embodiment.

FIG. 2 is a cross-sectional view through the magnetostrictive sensor 8 of the first embodiment. The magnetic flux paths within the shaft 16 are indicated with lines 22. The flux paths lead from the North pole 11 of the magnet 10 across an air gap to the surface of the shaft 16 and then extend within the shaft 16 generally in the North-to-South direction before crossing a further air gap between the surface of the shaft 16 and the South pole 13 of the magnet 12. The magnetic field inside the shaft 16 brings about an alignment of the magnetostrictive domains in the local direction of the magnetic field.

The permanent magnets 10 and 12 are connected by a magnetic loop member 20 having a half circle shape in section. The loop member 20 is joined to the distal ends of the permanent magnets 10 and 12 so that there is a high degree of closure to the magnetic field 22 thereby increasing the magnetic field permeating the magnetostrictive shaft 16 and reducing stray fields.

In the present embodiment, the permanent magnets 10 and 12 are made of sintered NiFeBr alloy and produce a magnetic flux density of approximately 350 mT. However, lower (or higher) strength magnets could also be used. An appropriate value of the magnetic flux density produced by the permanent magnets will depend on the composition and dimensions of the magnetostrictive shaft and the range of torques 38 that will be applied to the magnetostrictive shaft.

In use, the magnetostrictive shaft 16 produces a magnetic field in response to a torque 38 applied to the magnetostrictive shaft 16 that forces realignment of the magnetostrictive domains in the shaft. The magnetic field generated by the torque 38 perturbs the magnetic field produced by the permanent magnets 10 and 12. The flux detector 18 detects this perturbation. The output signal from the flux detector 18 is generally indicative of the magnitude of the torque 38. To the extent that the response is not perfectly linear, this can be compensated for by calibration in combination with appropriate processing of the output signal. The shaft 16 may be a steering column of an automobile or other vehicle, for example, and the outputs from the flux detector 18 used for feedback into an electronic power assisted steering control system.

Figure 3:
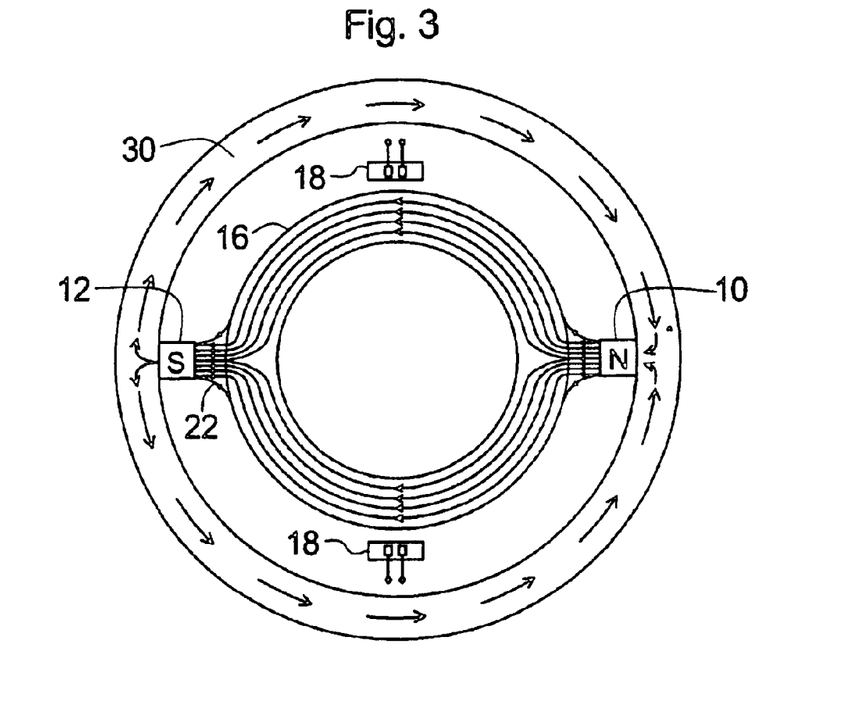
FIG. 3 is a cross-sectional view of a magnetostrictive torque sensor according to a second embodiment of the invention.

FIG. 3 shows a torque sensor according to a second embodiment of the invention. As in the first embodiment, the shaft 16 is made of magnetostrictive material and is magnetized in situ by an external magnetic field generated by a pair of permanent magnets 10 and 12 which penetrate into the shaft 16. The permanent magnets 10 and 12 are arranged so that a pair of opposite magnet poles 11 and 13 (i.e. North and South) are positioned circumferentially around the shaft facing the shaft. The opposite magnet poles induce a localized magnetic field in the magnetostrictive material of the shaft that passes between the opposite magnet poles 11 and 13. A pair of magnetic flux detector 18 is positioned radially outside the shaft circumferentially between the permanent magnets 10 and 12 so as to detect a component of the localized magnetic field which escapes from the magnetostrictive material when the shaft is subjected to a torque 38. It is noted that, with a hollow shaft construction, it would also be possible to arrange the flux detector(s) 18 inside the hollow part of the shaft. A ring 30 of magnetic material is also provided to connect the distal ends of the magnets 10 and 12, and to hold both the magnets 10 and 12, and the flux detectors 18.

The torque sensor 8 of the second embodiment is principally distinguished from that of the first embodiment in that the shaft 16 is hollow, rather than solid. The internal space within the hollow shaft serves to exclude magnetic flux, thereby concentrating the induced magnetic field radially outward of the torque axis, where the strain induced by the torque 38 will be higher and closer to the flux detectors 18. A hollow shaft is also more uniformly stressed by torsion than a solid shaft.

Figure 4:
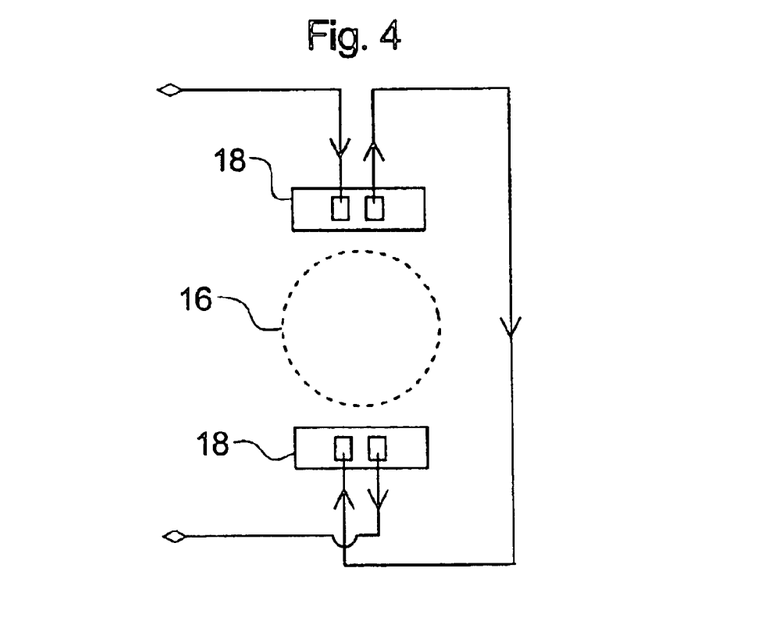
FIG. 4 shows the interconnections between the two flux detectors of FIG. 3.

FIG. 4 shows the electrical interconnections of the two flux detectors 18 of the second embodiment. As illustrated, the flux detectors 18 are wired in series. Moreover, the connections are such that the current induced by the magnetic flux in the two flux detectors sums together. This is achieved when terminals of like polarity are arranged circumferentially adjacent to each other as viewed around the outer surface of the shaft 16. This connection scheme is geometrically opposite to what would be done with the prior art, in which terminals of opposite polarity in circumferentially adjacent detectors would be connected together. This is because, in the prior art, the magnetic flux flows unidirectionally around the circumference of the shaft, for example clockwise, as a result of the unidirectional permanent magnetic poling. By contrast, in the present case, there are two circumferential field components one flowing clockwise and the other anti-clockwise around the shaft, as a result of the magnetic field being externally induced by the magnet poles.

Figure 5:
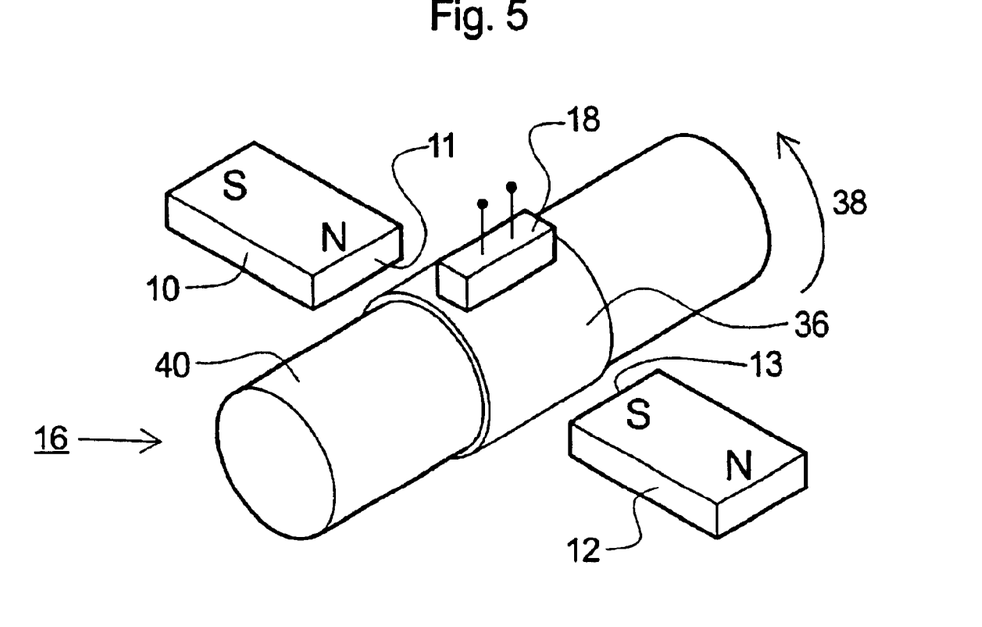
FIG. 5 is schematic drawing of a magnetostrictive torque sensor according to a third embodiment of the invention.

FIG. 5 shows a torque sensor according to a third embodiment of the invention. The arrangement is generally similar to that of the first embodiment in respect of the permanent magnets 10 and 12, the flux detector 18 and the shaft 16. However, in the third embodiment, the design of the shaft 16 is different. Instead of a simple shaft made of magnetostrictive material, the main body 40 of the shaft 16 is made of a material that is not magnetostrictive. The main body 40 is illustrated as being solid, but may be hollow or of any other internal construction. The main body 40 of the shaft has arranged on its outer surface adjacent to the permanent magnets 10 and 12 a layer of magnetostrictive material 36. This construction produces a similar concentration of the induced magnetic field as in the hollow shaft arrangement described above. Namely, the induced magnetic field is concentrated in the outer part of the shaft where the torque 38 is highest and proximal to the flux detectors.

In one example, the magnetostrictive layer 36 has a thickness of 1.5 mm and is deposited by a conventional thermal spraying process. Wire flame spraying is suitable. This process involves sputtering a pure metal or alloy wire with oxygen and fuel. Layers of up to 5 mm in thickness can be deposited without difficulty using thermal spraying. If thinner layers are preferred, conventional electroplating may be used. Layers of up to about 0.1 mm in thickness can be conveniently provided by electroplating.

Figure 6:
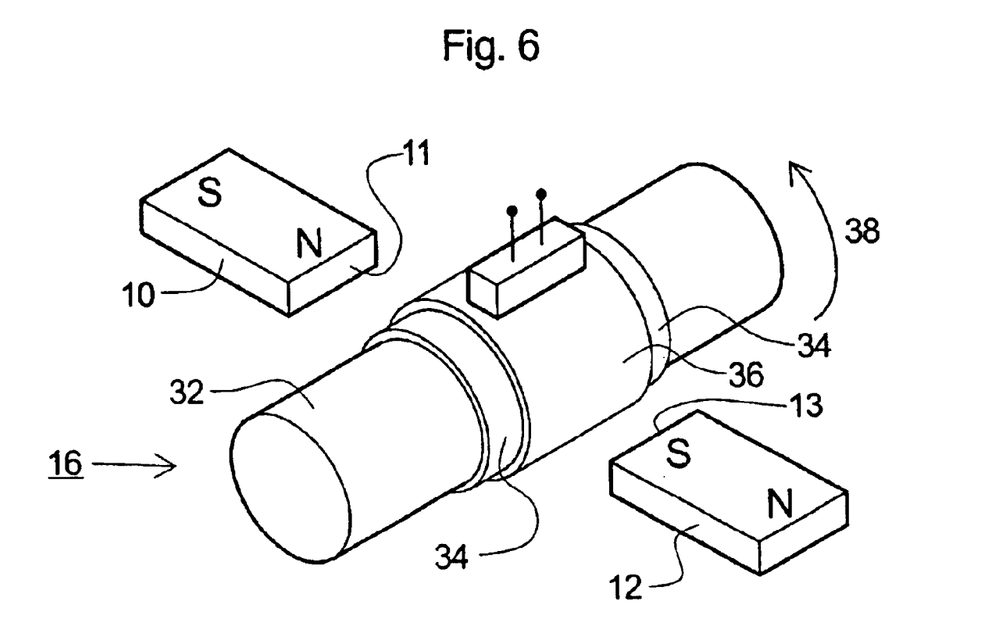
FIG. 6 is schematic drawing of a magnetostrictive torque sensor according to a fourth embodiment of the invention.

FIG. 6 shows a torque sensor according to a fourth embodiment of the invention. The arrangement is generally similar to that of the first embodiment in respect of the permanent magnets 10 and 12, the flux detector 18 and the shaft 16. However, in the fourth embodiment, a further alternative shaft design is employed. The shaft 16 comprises a main body 32 of magnetostrictive material, such as maraging NiFe alloy. The outer surface of the main body 32, in the active region of the shaft, has arranged thereon a layer 34 of low permeability material. In the present example, the low permeability layer is made of aluminum of typical thickness 0.5 to 1 mm. The low permeability layer 34 may be thermally sprayed or electroplated. The low permeability layer 34 has arranged thereon a layer 36 of magnetostrictive material. In the present example, the magnetostrictive layer 36 is made of Ni—Fe alloy, typically of thickness between 0.5 to 5 mm. The magnetostrictive layer 36 may be deposited by thermal spraying or electroplating. The purpose of the low permeability layer 34 is to resist penetration of the externally induced magnetic field into the magnetostrictive main body 32 of the shaft. In other words, the layer 34 isolates the active outer magnetostrictive layer 36 from the main body of the shaft, which would otherwise strongly influence the induced magnetic field pattern, owing to its magnetostrictive properties. It is therefore possible to select a material for the main body of the shaft which is magnetostrictive, without significantly altering the performance of the sensor. It will be appreciated that the main body of the shaft need not be solid, but may be hollow or of any other internal structure.

Figure 7:
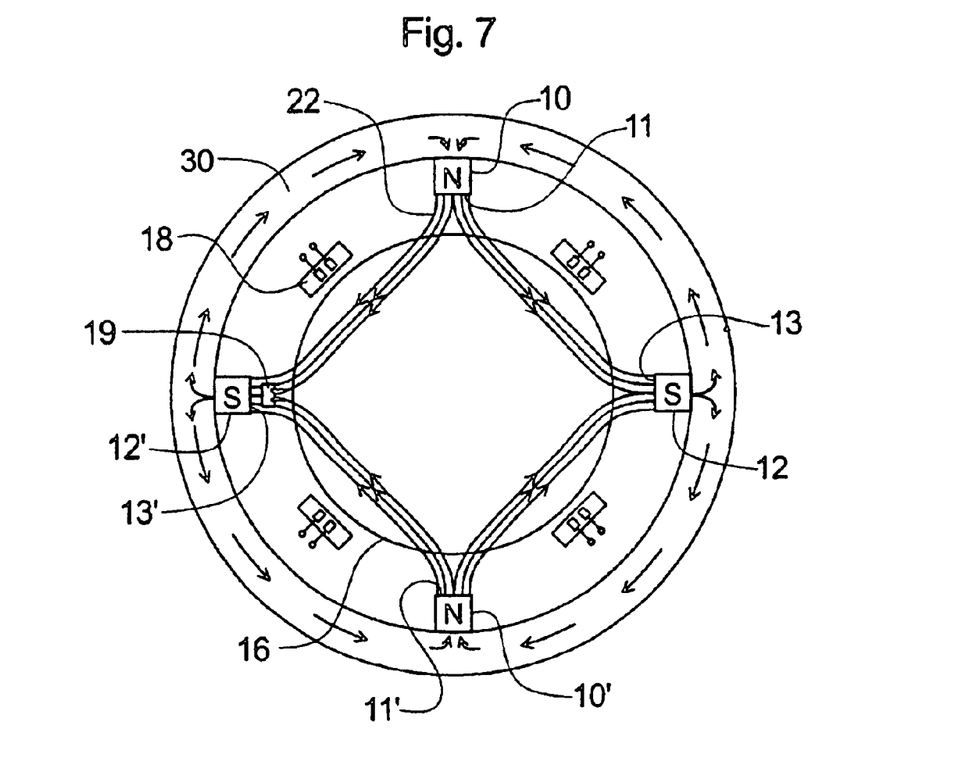
FIG. 7 is a schematic drawing in cross-section of a magnetostrictive torque sensor according to a fifth embodiment of the invention.

FIG. 7 shows in cross-section a torque sensor according to a fifth embodiment of the invention. The torque sensor 8 comprises four permanent magnets 10, 12, 10' and 12' arranged radially within and held in place by a ring 30 which is made of a magnetic material to give closure to the magnetic field 22 generated by the permanent magnets. The magnets are arranged so that circumferentially adjacent magnets have opposite poles 11, 13, 11', 13' facing the shaft 16 in a—sequence. In addition, the magnets are arranged at equal angular intervals of 90°, although this angular spacing is not critical and could be varied. With this arrangement, the magnetic flux penetrates the shaft 16 predominantly in its radially outer regions, thus achieving similar advantages to the above-described embodiments where flux is excluded from the central region either by use of a hollow shaft or provision of a flux excluding non-magnetic layer. The present embodiment has the additional advantage that the desired concentration of magnetic flux in the radially outer parts of the shaft is achievable with a simple solid shaft.

The torque sensor is provided with four flux detectors 18 arranged circumferentially between the permanent magnets 10, 12, 10' and 12' for measuring the magnetic flux component attributable to torque in the shaft 16. The flux detectors 18 are conveniently held in place by the ring 30. By increasing the number of flux detectors 18, variations in the signal caused by changes in the distance between the outer surface of the shaft and the flux detectors, e.g. owing to eccentricity in the shaft or its mounting, can be compensated for for smaller rotations of the shaft. This is advantageous for applications in which the shaft is not spinning rapidly, but is only being torqued as a result of small angular rotations of less than one or more full rotations. One example of such an application is the steering column of an automobile where the full lock-to-lock rotation may only be about one full rotation. A further feature of the fifth embodiment is the provision of an additional flux detector 19 arranged adjacent to one of the permanent magnets 12' in the air gap between the magnet pole 13' facing the shaft and the shaft. To avoid confusion with the flux detectors 18, the flux detector 19 is referred to as the magnet-monitoring flux detector in the following, and the flux detectors 18 as torque-sensing flux detectors. The magnet-monitoring flux detector 19 serves to provide an independent measure of the excitation energy that is supplied to the shaft 16 by the permanent magnet 12'. A perturbation in the strength of the magnetic field 22 supplied by the permanent magnets, caused for example by temperature fluctuations or aging of the permanent magnets, can thus be factored out of the output signal of the torque-sensing flux detectors 18. It will be appreciated that the magnet-monitoring flux detector 19 could be positioned adjacent to any of the permanent magnets. Further, it will be appreciated that multiple magnet-monitoring flux detectors may be provided, e.g. one for each active magnet pole.

Figure 8:
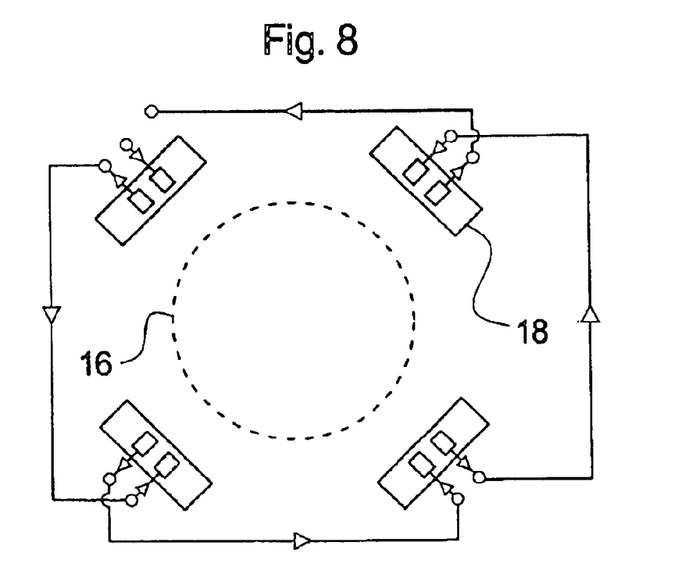
FIG. 8 shows the interconnections between four flux detectors of FIG. 7.

FIG. 8 shows the electrical interconnections of the four flux detectors 18 of the fifth embodiment. As illustrated, the flux detectors 18 are wired in series. Moreover, the connections are such that the current induced by the magnetic flux in the four flux detectors sums together. This is achieved when terminals of like polarity are arranged circumferentially adjacent to each other as viewed around the outer surface of the shaft 16. This connection scheme is geometrically opposite to what would be done with the prior art, as described further above in relation to the second embodiment.

Figure 9:
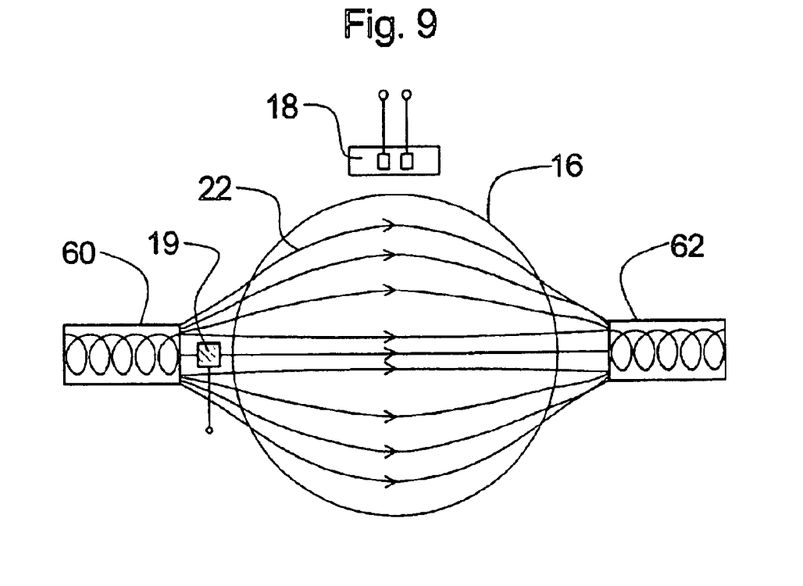
FIG. 9 is a schematic cross-section of a magnetostrictive torque sensor according to a sixth embodiment of the invention.

FIG. 9 shows in cross-section a torque sensor according to a sixth embodiment of the invention. This embodiment is analogous to the first embodiment, but uses electromagnets 60 and 62 in place of permanent magnets for inducing the magnetic field in the shaft 16. A field-monitoring flux detector 19 is provided in addition to a torque-sensing flux detector 18. The field-monitoring flux detector 19 can be used to control the magnetic field generated by the electromagnets, as illustrated in FIG. 10, as well as or instead of for passively compensating the signals generated by the torque-sensing flux detector 18.

Figure 10:
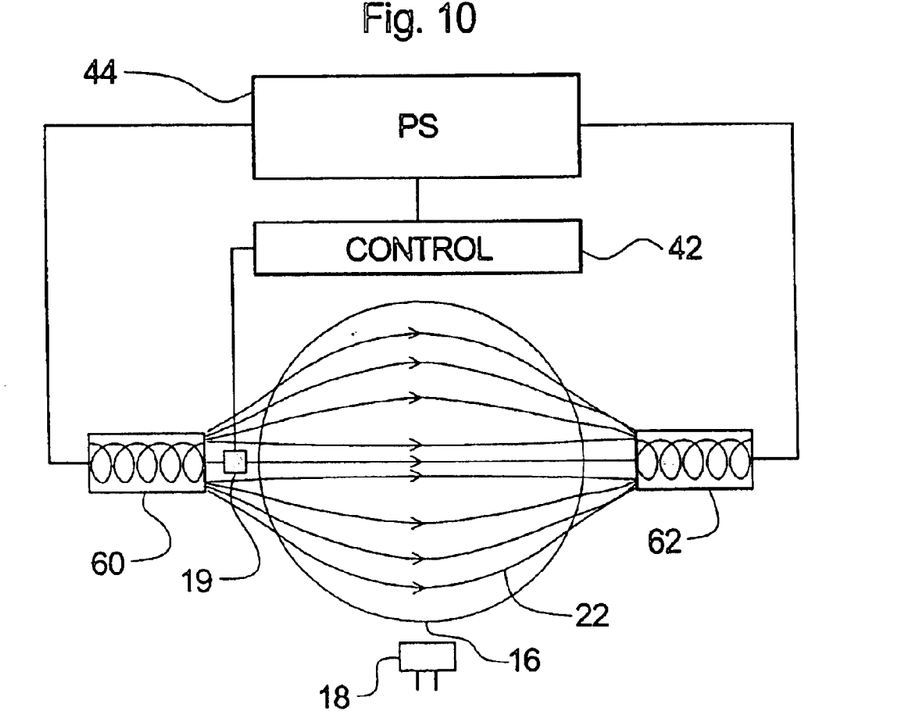
FIG. 10 is a schematic diagram of a feedback system employed for controlling the magnetic field in the sixth embodiment.

FIG. 10 is a block schematic drawing of the torque sensor of the sixth embodiment with associated electromagnet control system. Variation in the strength of the magnetic field 22 produced by the electromagnet 60 is detected by the magnet-monitoring flux detector 19. The magnet-monitoring flux detectors 19 feeds an output signal to a control circuit 42, the output signal being indicative of the magnitude of the instantaneous field of the electromagnet 60. The control circuit 42 then controls the power supplied to the coils of the electromagnets 60 and 62 via control of the electromagnets' power supply 44. Accordingly, the power supplied to the electromagnets can be stabilized in a feedback loop.

It will be understood that in any of the above embodiments, the number of flux detectors 18 may be varied as described in relation to the other embodiments to provide further variants.

It will also be understood that in any of the above embodiments, one or more magnet-monitoring flux detectors may be provided, e.g. one only, or one for each active magnet pole.

Figure 11:
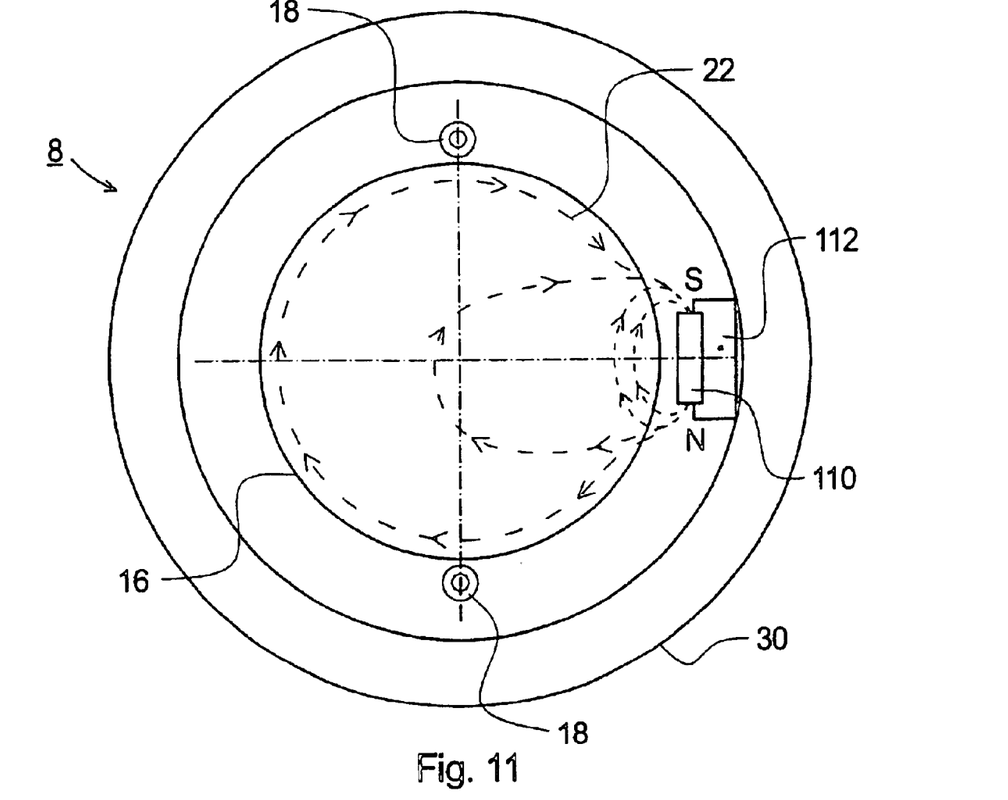
FIG. 11 is a cross-sectional view of a magnetostrictive torque sensor according to a seventh embodiment.

FIG. 11 is a cross-sectional view of a magnetostrictive torque sensor according to a seventh embodiment of the invention. The magnetostrictive sensor 8 comprises a shaft 16 which is made of a magnetostrictive material, but is not itself permanently magnetized. The shaft 16 is illustrated as a solid shaft, but any of the shaft designs discussed with reference to the previous embodiments could be used. A single permanent magnet 110, which has a length of 20 mm in one example, is arranged adjacent to the surface of the shaft 16 with its North-South axis extending tangentially relative to the circumference of the shaft 16 and perpendicular to the principal axis of rotation of the shaft 16. (It will be understood that exact tangential and perpendicular alignment is not necessary, but that the alignment should approximately conform to these criteria. For example, the tangential angle may vary by 10, 20 degrees or more and the perpendicular alignment may vary by 10, 20, 30, 40 degrees or more.) This arrangement has in common with the previous embodiments that a pair of opposite magnet poles are positioned circumferentially around the shaft 16, but differs from the previous embodiments in respect of the alignment of the magnet in relation to the shaft. The permanent magnet 110 is held to a flux ring 30 by a magnet holder 112 which is preferably made of non-magnetic material such as aluminum. The flux ring 30 may be made of steel or other magnetic material. The flux ring arrangement is similar to that of the second embodiment.

The sensor 8 is provided with a pair of magnetic flux detectors 18 arranged at ±90° relative to the permanent magnet 110 and 180° apart in cross-section as viewed along the rotational axis of the shaft 16. In other words, the magnetic flux detectors 18 are positioned radially opposite to each other on either side of the shaft 16. The magnetic flux detectors 18 are preferably saturated coil detectors, but other detectors could be used as discussed in relation to the previous embodiments.

The flux ring 30 acts as a magnetic shield for the flux detectors 18. Consequently, external magnets or magnetic fields will have a negligible effect on the device performance.

Figure 12:
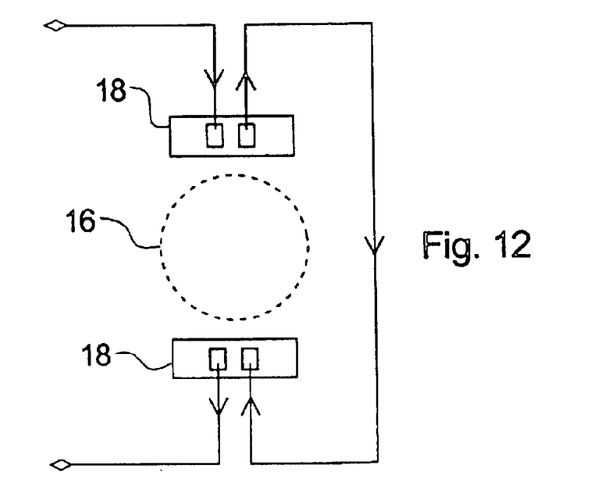
FIG. 12 shows the interconnections between the flux detectors for the seventh embodiment.

FIG. 12 shows how the coil detectors are connected in series. The connection scheme is to be compared with that of the second embodiment illustrated in FIG. 4. The connection scheme is different from that of the second embodiment owing to the fact that the magnetic field induced in the surface of the shaft 16 flows unidirectionally around the greater part of the shaft surface, as illustrated in FIG. 11, with only a small part of the shaft surface lying directly adjacent to the permanent magnet 110 having magnetic flux flowing in the opposite circumferential direction.

The arrangement of the seventh embodiment in which the magnetic field is induced by opposite magnetic poles aligned along an axis perpendicular to the axis of the shaft 16 tangentially to the shaft surface has several advantages. It allows a torque sensor to be made with a simple single bar magnet, thereby reducing cost. It provides a greater amount of circumferential magnetization by concentrating the induced magnetic field in the outer portion of the shaft 16. It reduces the amount of differential field in comparison with the multiple magnet arrangements described in the previous embodiments. The use of multiple magnetic flux detectors to measure the flux induced by a single magnet allows a reduction in the rotational perturbation of the signal and increases the sensitivity-to-perturbation ratio. The illustrated arrangement with a pair of coils being arranged diametrically opposite to each other, i.e. at 180° to each other, provides for the maximum reduction in perturbation. (The detector pair could of course be arranged at different angles to each other over a wide range, although the further their angular positions deviate from 180° to each other, the less perturbation cancellation is expected. It would of course also be possible to only use a single magnetic flux detector, but no perturbation cancellation effects would then be achieved).

In an example of the seventh embodiment, the output from the flux detector circuit is set at 2.5 volts under zero torque conditions. When a torque is applied to the shaft 16, the easy domains of the crystals, which are aligned circumferentially, are forced to rotate. In turn, this causes a flux change in the coils. The output from the flux detector circuit is then changed with the voltage changing linearly proportionally to the applied torque.

Figure 13:
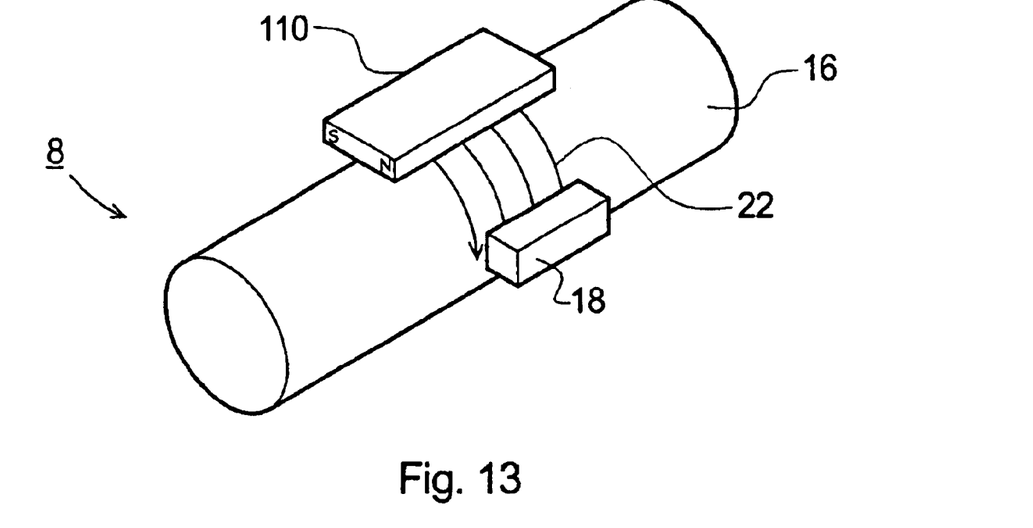
FIG. 13 is a schematic perspective view of the magnetostrictive torque sensor of the seventh embodiment.

FIG. 13 shows the magnetostrictive torque sensor of the seventh embodiment in schematic perspective view. The single permanent magnet 110 can be seen arranged adjacent to the magnetostrictive shaft 16, as previously described, with one of the magnetic flux detectors 18 being evident in its arrangement displaced by 90° from the permanent magnet 110 as viewed along the shaft axis. The circumferential field lines 22 induced by the permanent magnet 110 are also illustrated.

It will be understood that many of the variations discussed in relation to the first to sixth embodiments can be made to the design of the seventh embodiment. In particular, the permanent magnet may be replaced with an electromagnet, various different types of magnetic flux detector may be used, and additional magnetic-monitoring flux detectors may be included. In addition to those variations, it will be understood that although use of a single permanent magnet is preferred in the seventh embodiment, multiple permanent magnets could be used with the advocated perpendicular alignment between the shaft axis and North-South axis of the permanent magnet.

Figure 14:
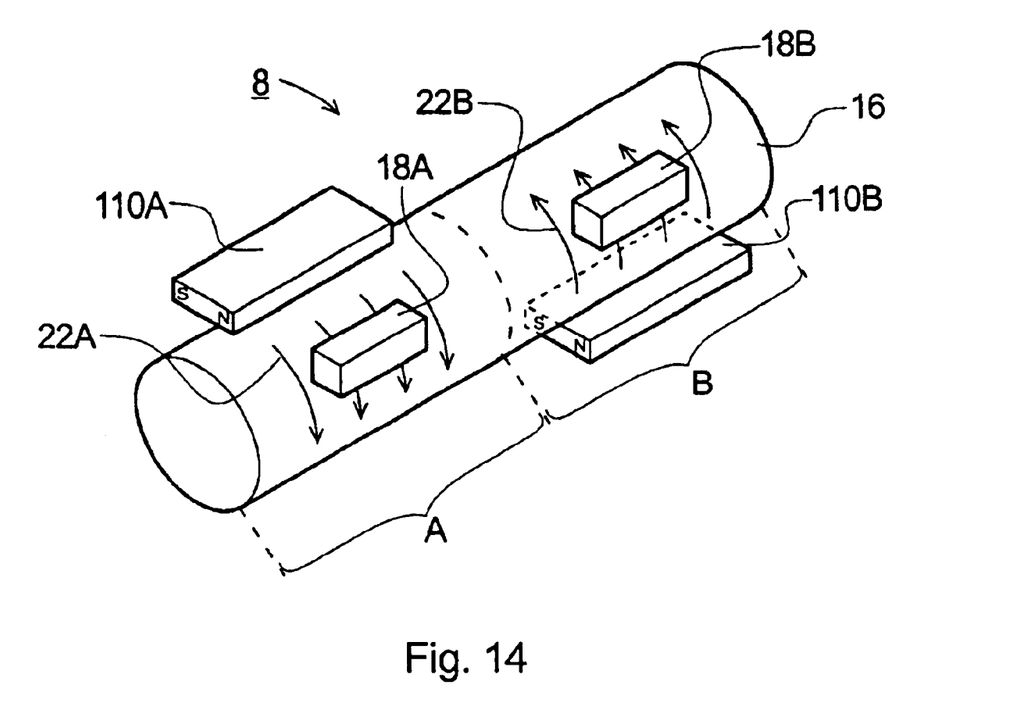
FIG. 14 is a schematic perspective view of the magnetostrictive torque sensor according to an eighth embodiment.

FIG. 14 is a perspective view of a magnetostrictive torque sensor according to an eighth embodiment of the invention. The magnetostrictive sensor 8 comprises a shaft 16 which is made of a magnetostrictive material, but is not itself permanently magnetized. The shaft 16 is illustrated as a solid shaft, but any of the shaft designs discussed with reference to the previous embodiments could be used. In a first length portion or zone along the shaft, labeled as Zone A in the figure, a first permanent magnet 110A, which has a length of 20 mm in one example, is arranged adjacent to the surface of the shaft 16 with its North-South axis extending tangentially relative to the circumference of the shaft 16 and perpendicular to the principal axis of rotation of the shaft 16. The shaft comprises a second length portion or zone, labeled as Zone B in the figure, axially adjacent to the first length portion A, in which a second permanent magnet 18B is arranged. The second permanent magnet 18B is arranged adjacent to the surface of the shaft 16 with its North-South axis extending tangentially relative to the circumference of the shaft 16 and perpendicular to the principal axis of rotation of the shaft 16. However, the second permanent magnet 110B has its poles arranged oppositely to those of the first permanent magnet 110A so that the two permanent magnets induce respective circumferential fields of opposite direction, i.e. clockwise and counterclockwise, in the Zones A and B. Zones A and B are provided with respective pairs of magnetic flux detectors 18A and 18B arranged at ±90° relative to the permanent magnets 110A and 110B, and arranged 180° apart in cross-section as viewed along the rotational axis of the shaft 16. Only one of each of the flux detectors of each pair is visible in the figure, but the arrangement will be appreciated with reference to the seventh embodiment. Each zone thus has its own magnet and flux detectors fixed to a flux ring (not shown), as described in connection with the seventh embodiment. Further zones may be added if desired.

The multiple zone arrangement of the eighth embodiment is advantageous in that it will tend to cancel out any spurious magnetic fields which may otherwise exist at the ends of the shaft 16.

Figure 15:
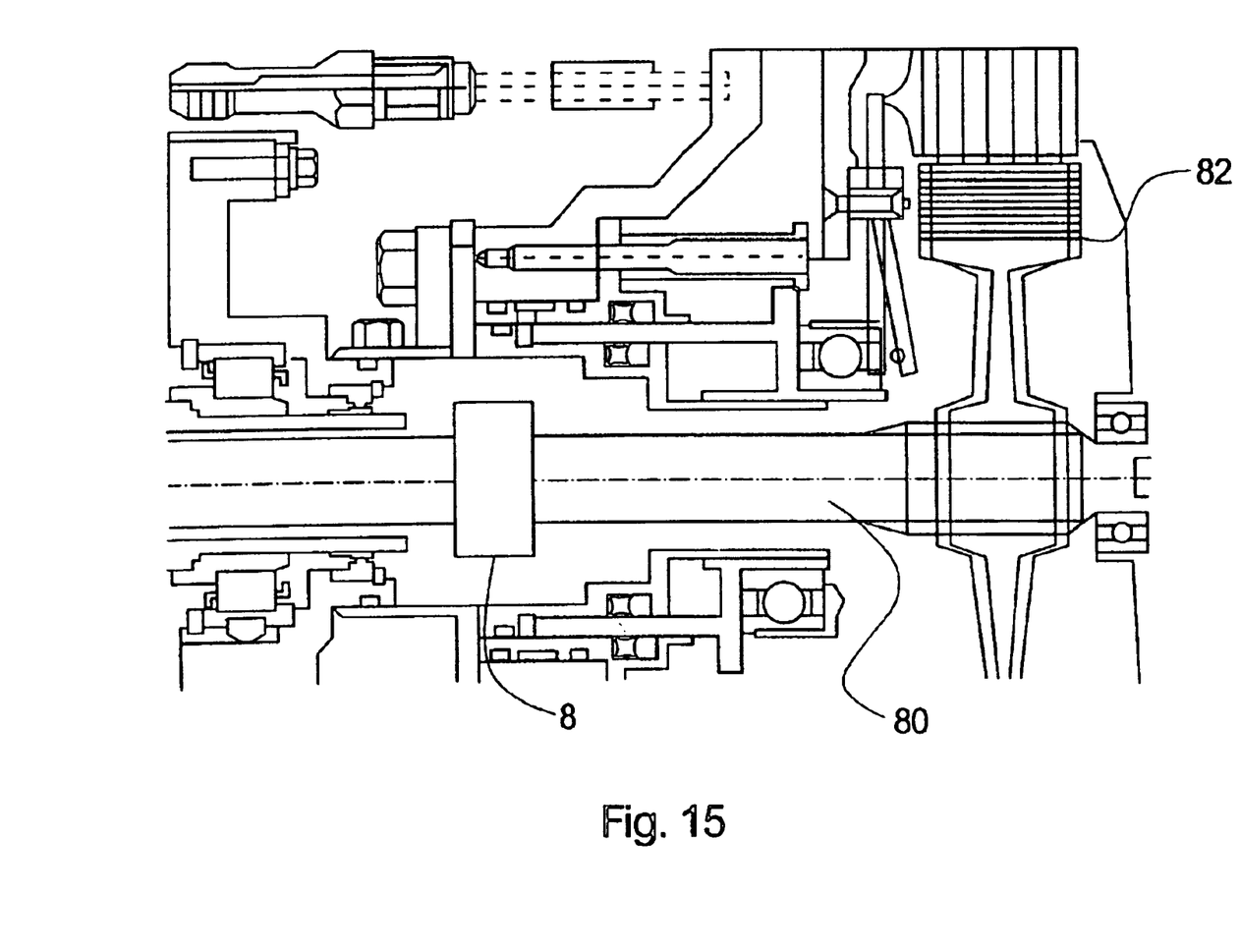
FIG. 15 is a section of an automotive gearbox with a torque sensor embodying the invention.

FIG. 15 is a section of an automotive gearbox with a torque sensor 8 embodying the invention arranged therein. The torque sensor 8 is arranged around the main shaft 80. The clutch 82 is also evident.

What is claimed is:

1. A torque sensor comprising:
   a shaft comprising magnetostrictive material;
   a pair of opposite permanent magnet poles defining an axis that is aligned tangentially to a circumferential surface of the shaft so as to induce a localized magnetic field in the magnetostrictive material between the opposite magnet poles, wherein the magnet poles are arranged with the shaft to induce the localized magnetic field during torque sensing with the torque sensor; and at least one torque-sensing flux detector positioned to detect a component of the localized magnetic field which escapes from the magnetostrictive material when the shaft is torqued.

2. A torque sensor according to claim 1, wherein the at least one torque-sensing flux detector comprises a pair of torque-sensing flux detectors positioned on opposite sides of the shaft circumferentially displaced from the pair of opposite permanent magnet poles.

3. A torque sensor according to claim 1, further comprising a magnet-monitoring flux detector positioned to detect the magnetic field produced by one of the permanent magnet poles prior to penetration into the shaft.

4. A torque sensor according to claim 1, wherein the shaft is hollow.

5. A torque sensor according to claim 1, wherein the shaft is made substantially only from the magnetostrictive material.

6. A torque sensor according to claim 1, wherein the shaft comprises a main body of non-magnetostrictive material and an outer layer of the magnetostrictive material.

7. A torque sensor according to claim 1, wherein the shaft comprises a main body of magnetostrictive or non-magnetostrictive material surrounded by a layer of low permeability material which is in turn surrounded by an outer layer of the magnetostrictive material.

8. A torque sensor according to claim 7, wherein the pair of opposite permanent magnet poles are poles of a single magnet.

9. A steering column having a torque sensor comprising:

a shaft comprising magnetostrictive material;

a pair of opposite permanent magnet poles defining an axis that is aligned tangentially to a circumferential surface of the shaft so as to induce a localized magnetic field in the magnetostrictive material between the opposite magnet poles, wherein the magnet poles are arranged with the shaft to induce the localized magnetic field during torque sensing with the torque sensor; and at least one torque-sensing flux detector positioned to detect a component of the localized magnetic field which escapes from the magnetostrictive material when the shaft is torqued.

10. A steering column according to claim 9, wherein the torque-sensing flux detector and a further torque-sensing flux detector are positioned on opposite sides of the shaft circumferentially displaced from the pair of opposite permanent magnet poles.

11. A torque sensor comprising:

a shaft comprising magnetostrictive material;

a first pair of opposite permanent magnet poles defining a first axis that is aligned tangentially to a circumferential surface of the shaft so as to induce a first localized magnetic field in the magnetostrictive material in a first circumferential direction;

a second pair of opposite permanent magnet poles arranged axially displaced along the shaft from the first pair of opposite magnet poles and defining a second axis that is aligned tangentially to the circumferential surface of the shaft so as to induce a second localized magnetic field in the magnetostrictive material in a second circumferential direction opposed to the first circumferential direction, wherein the first and second pairs of magnet poles are arranged with the shaft to induce the first and the second localized magnetic field during torque sensing with the torque sensor; and first and second torque-sensing flux detectors positioned to detect first and second components of the first and second localized magnetic fields which escape from the magnetostrictive material when the shaft is torqued.

12. A gearbox having a torque sensor comprising:

a shaft comprising magnetostrictive material;

a pair of opposite permanent magnet poles defining an axis that is aligned tangentially to a circumferential surface of the shaft so as to induce a localized magnetic field in the magnetostrictive material between the opposite magnet poles, wherein the magnet poles are arranged with the shaft to induce the localized magnetic field during torque sensing with the torque sensor; and at least one torque-sensing flux detector positioned to detect a component of the localized magnetic field which escapes from the magnetostrictive material when the shaft is torqued.

13. A gearbox according to claim 12, wherein the torque-sensing flux detector and a further torque-sensing flux detector are positioned on opposite sides of the shaft circumferentially displaced from the pair of opposite permanent magnet poles.

14. A torque sensor comprising:

a shaft comprising magnetostrictive material;

a pair of opposite permanent magnet poles arranged on one side of the shaft and defining an axis that is aligned substantially perpendicular to a principal axis of the shaft so as to induce a localized magnetic field in the magnetostrictive material between the opposite magnet poles, wherein the magnet poles are arranged with the shaft to induce the localized magnetic field during torque sensing with the torque sensor; and at least one torque-sensing flux detector positioned to detect a component of the localized magnetic field which escapes from the magnetostrictive material when the shaft is torqued.

15. A method of sensing torque comprising:

(a) providing a shaft comprising magnetostrictive material;

(b) applying an external magnetic field to the shaft during torque sensing using a pair of opposite permanent magnet poles defining an axis that is aligned tangentially to a circumferential surface of the shaft so as to induce a localized magnetic field in the magnetostrictive material between the opposite magnet poles;

(c) torquing the shaft so that a component of the internal magnetic field escapes from the magnetostrictive material; and (d) detecting the escaped component of the internal magnetic field and providing a torque signal responsive thereto.

16. A method according to claim 15, wherein the detecting of the escaped component of the internal magnetic field is performed using a pair of torque-sensing flux detectors positioned on opposite sides of the shaft circumferentially displaced from the pair of opposite permanent magnet poles.

* * * * *